United States Patent Office 3,350,315
Patented Oct. 31, 1967

3,350,315
ROAD SALT COMPOSITION
Frank L. Schneider, 8 Round Hill Lane,
Port Washington, N.Y. 11050
No Drawing. Filed Aug. 2, 1965, Ser. No. 476,665
1 Claim. (Cl. 252—70)

This invention relates to road salt compositions of the type suitable for the control of ice and snow deposits on roadways and walkways.

The phenomenon of "melting" ice by scattering salts on its surface is too well known to require detailed explanation. Briefly, the melting is attributed to the fact that aqueous solutions of electrolytes have lower freezing points than pure water. Hence the same materials, when frozen will melt at a lower temperature than pure ice.

Obviously salts used for this purpose must be available in huge quantities and must be extremely inexpensive. One very suitable source of such salt is the sodium chloride of sea water or synthetic brines used in the commercial production of sodium chloride. A very convenient source of concentrated salt solutions is a plant which converts sea water to potable water. Most of these plants function by removing a relatively small amount of pure, potable water from a large volume of sea water. The effluent water, which is much more concentrated in sodium chloride is normally simply returned to the source.

Evaporation of ordinary sea water, effluent water of the type defined above or of any of the synthetic brines produced in recovering sodium chloride from underground deposits should produce dry salt compositions suitable for use as road salt in the large quantities required and at relatively small expense. Unfortunately sodium chloride compositions thus produced are corrosive to metallic surfaces, such as the underbodies of motor vehicles.

Pure sodium chloride or solutions of it does not attack metals. It is neither acidic nor alkaline and is so stable that it normally will not be decomposed by other substances, particularly if these are in the elemental state. However, when other substances are mixed with sodium chloride, corrosion of metals can take place rapidly and easily. For example, a solution of sodium chloride and a weak acid such as acetic or carbonic acid is extremely acidic and the solution readily corrodes metallic surfaces. This effect is probably attributable to the exchange reaction:

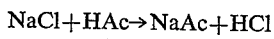

$$NaCl + HAc \rightarrow NaAc + HCl$$

The concentration of hydrochloric acid is relatively low, but if some other substance, such as a metallic surface is available with which it can react, the hydrochloric acid will be consumed and the reaction will move to the right to produce more hydrochloric acid. The solution of neutral sodium chloride and weakly acidic acetic acid is acting as though it were a strong acid.

Vernon (Trans. Faraday Soc. 31, 1668–70, 1935) established that rusting was hardly a problem in highly purified air even at relative humidities of 99%. However, introduction of even a trace of sulfur dioxide into the air initiated corrosion at humidities as low as 50%. It is obvious that it is the acidic component that causes the corrosion.

When sodium chloride is scattered on icy or snow-covered roads, the solution is spattered on the underside of motor vehicles. Here it can pick up carbon dioxide as well as other acidic components of the air such as sulfur dioxide, and the reaction described above will ensue.

All sea water contains a fairly large amount of magnesium or other alkaline earth metals particularly calcium and strontium. These salts are present, for the most part, in the form of soluble halide salts, principally the chloride. They are highly hydrolyzed in water solution to provide a weak base, e.g. magnesium hydroxide and a strong acid, hydrochloric acid. Sodium chloride, on the other hand, is not hydrolyzed and remains neutral. The solutions therefore are very corrosive.

Most artificial brines also contain relatively large quantities of alkaline earth metal salts particularly chlorides.

It is apparent therefore that simple evaporation of sea water or artificial brines will produce a dry composition which when again mixed with water will produce an acidic, corrosive mixture. The dry composition thus obtained is not suitable as a road salt.

Another reason for the unsuitability of sea water or artificial brine as a source of road salt is that when these compositions are evaporated completely, the magnesium chloride is obtained in the form of the hexahydrate. This material, on further heating, as may happen in an evaporator, decomposes to form hydrogen chloride and magnesium oxide. The latter oxide will react with additional magnesium chloride to form a type of cement. The disadvantages of an evaporation resulting in such a hard, water insoluble substance are obvious.

Another disadvantage resulting from the presence of magnesium chloride in the sodium chloride is that the magnesium salt absorbs atmospheric moisture. This results in the caking of the salt crystals or formation of large blocks difficult to use in conventional spreading machinery.

The present invention has for its principal object the production of a road salt composition containing at least 90% and up to 98% or higher of sodium chloride together with, at least 0.5% and up to 5% of an oxide, hydroxide or hydrated oxide of an alkaline earth metal or magnesium. The compositions when taken up in water will yield a non-acidic mixture which is generally neutral to slightly alkaline, with a hydrogen ion concentration in the range of from pH 7 to 10.

The compositions produced in accordance with this invention alleviate the problem of corrosion by (a) making available basic substances in the sodium chloride composition which will neutralize the weak acids, and (b) converting most metallic salts other than alkali metal salts into neutral or basic substances which do not hydrolyze to give acidic materials. The principal constituent is ordinarily magnesium oxide. Other metals such as zinc or iron which form oxides, hydroxides or hydrated oxides under the conditions of this invention may also be present in trace amounts, e.g. up to about 0.5% by weight in the composition. Normally the basic material will comprise by weight at least 1% and up to 5% or slightly more of the composition. Of these at least 0.5% is a magnesium base. In addition to magnesium, sea water contains calcium and strontium as the principal alkaline earth metals. Trace amounts of other metals may also be present. Accordingly, compositions within the scope of this invention will contain bases formed from these metals in addition to the sodium chloride.

Compositions within the scope of this invention are obtained by adjusting the pH of the source material to at least 6 and preferably 7 to 9 before evaporation. While more alkaline solutions, even up to pH 11 or higher may be used, it is more economical to operate at the lower pH, i.e. 7 to 9 since at this pH most of the magnesium salts present are converted to the hydroxide which upon evaporation is converted to the oxide. Other metals present such as barium, strontium, calcium, iron, zinc, tin, lead, antimony, nickel, cobalt and the like will be more or less converted to oxides, hydroxides or hydrated oxides depending upon the basicity of the mixture and the tenacity with which they retain water.

A preferred method for achieving the proper pH level is by electrolysis since the pH level of salt water or brines increases during electrolysis. At the same time chlorine is produced and liberated. It is preferred to aerate the mixture to aid in the removal of free chlorine. As the basicity of the solution increases, magnesium hydroxide forms and precipitates. It may be collected, if desired, prior to evaporation so as to provide a substantially pure sodium chloride product. However, it is preferred to retain it in the mixture and to collect it with the other salts when the water is evaporated to produce a road salt containing sufficient base to substantially prevent the corrosive action of sodium chloride.

The electrolysis can be carried out most efficiently in a continuous process with provision made for keeping the magnesium hydroxide in suspension. Since salt solutions are electrically conducting it is necessary that there be no direct connection between the intake and outlet streams of the bath. The electrical discontinuity can be effected by breaking up the liquid streams into drops. In one preferred method of accomplishing the purpose of this invention, the salt solution is allowed to fall upon a spinning disk. The centrifugal action breaks the liquid into droplets which are thrown against the walls of the container within which the disk is placed. These drops are then collected suitably by means of gravity, and the resulting stream is fed into the electrolytic chamber. Electrical insulation is thus required only at the points at which the inlet and outlet ports are located.

The electrolytic chamber may be any type of a closed vessel. It is preferred that the collected stream from the above process be introduced near the anode and directed toward the cathode so that the chlorine gas generated at the former may be quickly removed.

The completeness of the electrolysis is not determined by any preset time period, but by the basicity of the electrolyzed solution. Thus it is possible to control the rate of flow through the electrolytic vessel by means of cut-off valves controlled by apparatus sensitive to pH change. In a preferred system of this type, a pH meter is used to measure the pH of the stream issuing from the reaction chamber. When the pH is not high enough cut-off valves controlled by solenoids connected to the pH measuring device are partially closed to reduce the rate of flow through the tank permitting longer electrolysis and a more basic final solution. The reverse procedure, opening the valves, would occur when the solution is too basic.

As indicated heretofore, aeration of the solution in the chamber, particularly around the anode where the chlorine is formed, will help to remove from the solution any gas generated and maintain the pH on the basic side. In this connection, it has been found advantageous to have some means of separating the two plates of the cell. This prevents the chlorine from neutralizing the alkaline material formed at the cathode while a means of connection between the two sides, such as small apertures in the bottom of the plate, so that little of the generated gas will tend to get through, still allows the reaction at the negative plate to proceed.

As before, the stream from the electrolytic chamber must be isolated from the cell itself. This is preferably accomplished by the "drop" method described above. The effluent stream from the electrolytic cell is dropped onto a rotating disk in a container and the disconnected drops collected and led to an evaporator of any convenient design.

This product contains magnesium in the form of the oxide. When moistened, as for example, when strewn upon an icy road, thus forming an ionic solution of sodium chloride, this oxide is hydrolyzed to magnesium hydroxide. It is then in a form which will react with any acidic substances to help prevent the formation of corrosive acids.

What is claimed is:

A road salt composition consisting essentially of at least 90% by weight of sodium chloride together with at least 0.5% by weight of magnesium oxide, said composition prepared by concentration of sea water which has been subjected to electrolysis to adjust pH to a value at which the magnesium values precipitate as the oxide, with removal of the chlorine as formed in the electrolysis.

References Cited
UNITED STATES PATENTS

| | | | |
|---|---|---|---|
| 1,140,995 | 5/1915 | Miller | 23—89 |
| 1,750,761 | 3/1930 | Martin | 23—89 |

OTHER REFERENCES

Bennett, The Chemical Formulary, vol. V, page 616 (1941).

LEON D. ROSDOL, *Primary Examiner.*

SAMUEL H. BLECH, *Examiner.*

J. D. WELSH, *Assistant Examiner.*